United States Patent
Jian et al.

(10) Patent No.: US 11,112,656 B2
(45) Date of Patent: Sep. 7, 2021

(54) LIQUID CRYSTAL DRIPPING NOZZLE, LIQUID CRYSTAL DRIPPING DEVICE AND METHOD FOR DRIPPING LIQUID CRYSTAL

(71) Applicants: BOE TECHNOLOGY GROUP CO., LTD., Beijing (CN); ORDOS YUANSHENG OPTOELECTRONICS CO., LTD., Inner Mongolia (CN)

(72) Inventors: Shuaimin Jian, Beijing (CN); Weixin Meng, Beijing (CN); Jian Guo, Beijing (CN); Lubiao Sun, Beijing (CN); Wei Zheng, Beijing (CN); Yanzhao Peng, Beijing (CN)

(73) Assignees: BOE TECHNOLOGY GROUP CO., LTD., Beijing (CN); ORDOS YUANSHENG OPTOELECTRONICS CO., LTD., Ordos (CN)

( * ) Notice: Subject to any disclaimer, the term of this patent is extended or adjusted under 35 U.S.C. 154(b) by 481 days.

(21) Appl. No.: 16/019,036

(22) Filed: Jun. 26, 2018

(65) Prior Publication Data
US 2019/0049765 A1 Feb. 14, 2019

(30) Foreign Application Priority Data
Aug. 11, 2017 (CN) .......................... 201710690678.0

(51) Int. Cl.
B05C 5/02 (2006.01)
G02F 1/1341 (2006.01)
G02F 1/13 (2006.01)

(52) U.S. Cl.
CPC .......... *G02F 1/1341* (2013.01); *G02F 1/1303* (2013.01); *B05C 5/027* (2013.01); *G02F 1/13415* (2021.01)

(58) Field of Classification Search
None
See application file for complete search history.

(56) References Cited

U.S. PATENT DOCUMENTS 7,450,214 B2 11/2008 Otani
8,851,337 B2 * 10/2014 Xiong .................. G02F 1/1303
222/330

(Continued)

FOREIGN PATENT DOCUMENTS

CN 1749817 A 3/2006
CN 101510028 A 8/2009

(Continued)

OTHER PUBLICATIONS

The First Chinese Office Action dated Aug. 21, 2019; Appln. No. 201710690678.0.

*Primary Examiner* — Cachet I Proctor

(57) ABSTRACT

A liquid crystal dripping nozzle, a liquid crystal dripping device, and a method of dripping liquid crystal are provided. The liquid crystal dripping nozzle includes: a carrier; a main dripping nozzle, disposed in a central region of the carrier and configured for dripping liquid crystal; and a plurality of auxiliary dripping nozzles, disposed in a corner region of the carrier and configured for dripping liquid crystal, wherein the plurality of auxiliary dripping nozzles are arranged around the main dripping nozzle.

16 Claims, 3 Drawing Sheets

(56) References Cited

U.S. PATENT DOCUMENTS

| | | | |
|---|---|---|---|
| 8,888,548 B2 | 11/2014 | Yi | |
| 2006/0061727 A1* | 3/2006 | Otani | G02F 1/1341 |
| | | | 349/190 |
| 2006/0132702 A1* | 6/2006 | Chen | G02F 1/133723 |
| | | | 349/187 |
| 2018/0196292 A1* | 7/2018 | Ye | G02F 1/1339 |

FOREIGN PATENT DOCUMENTS

| | | | |
|---|---|---|---|
| CN | 101510028 B * | 9/2010 | |
| CN | 202929333 U | 5/2013 | |
| CN | 203745774 U | 7/2014 | |
| CN | 204353048 U | 5/2015 | |
| JP | 2002-258299 A | 9/2002 | |
| JP | 2005-043908 A | 2/2005 | |
| JP | 2010-185921 A | 8/2010 | |
| KR | 1100932297 B1 | 12/2009 | |
| KR | 1020110059123 A | 6/2011 | |
| KR | 1020130061359 A | 6/2013 | |
| PA | 2010-054556 A | 3/2010 | |
| WO | WO-2015186743 A1 * | 12/2015 | B05D 1/26 |

\* cited by examiner

LIQUID CRYSTAL DRIPPING NOZZLE, LIQUID CRYSTAL DRIPPING DEVICE AND METHOD FOR DRIPPING LIQUID CRYSTAL

CROSS REFERENCE TO RELATED APPLICATION

The present application claims priority of Chinese Patent Application No. 201710690678.0 filed on Aug. 11, 2017, the disclosure of which is incorporated herein by reference in its entirety as part of the present application.

TECHNICAL FIELD

Embodiments of the present disclosure relate to a liquid crystal dripping nozzle, a liquid crystal dripping device and a method for dripping liquid crystal.

BACKGROUND

A liquid crystal (LC) dripping method in a traditional liquid crystal display (LCD) product usually adopts an averaged "I-shaped" mode. An LC pattern is designed according to product standard, and a target LC amount is averaged to every drop of pattern. The dripping method has advantages of convenience and quickness in implementation. For example, it spends 180 seconds to drip the liquid crystal on a single glass substrate produced by 5.5-generation production line during the formation of the LC pattern.

However, the liquid crystal dripping method has a risk of light leakage in corners of the LC pattern, due to a fact that diffusion of the liquid crystal in corners is limited by a distance from the dripping position to the corner. For example, if the distance is too large, the liquid crystal may not be fully diffused to all the corners of the display panel, which results in poor light leakage in corners; if the distance is too small, severe puncture and poor liquid leakage may be caused in corners.

SUMMARY

Embodiments of the present disclosure provide a liquid crystal dripping nozzle, a liquid crystal dripping device and a method for dripping liquid crystal.

In first aspect of the present disclosure, it is provided a liquid crystal dripping nozzle, comprising: a carrier; a main dripping nozzle, disposed in a central region of the carrier and configured for dripping liquid crystal; and a plurality of auxiliary dripping nozzles, disposed in a corner region of the carrier and configured for dripping liquid crystal, wherein the plurality of auxiliary dripping nozzles are arranged around the main dripping nozzle.

In second aspect of the present disclosure, it is provided a liquid crystal dripping device, which comprises the above liquid crystal dripping nozzle In third aspect of the present disclosure, it is provided a method for dripping a liquid crystal by using the above liquid crystal dripping nozzle, comprising: dripping the liquid crystal in a central region of a liquid crystal pattern through the main dripping nozzle; switching the main dripping nozzle to the auxiliary dripping nozzles; and dripping the liquid crystal in a corner region of the liquid crystal pattern through the plurality of auxiliary dripping nozzles, wherein a total amount of the liquid crystal dripped by the plurality of auxiliary dripping nozzles is equal to an amount of the liquid crystal dripped by the main dripping nozzle.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those ordinarily skilled in the art can obtain other embodiment(s), without any inventive working, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
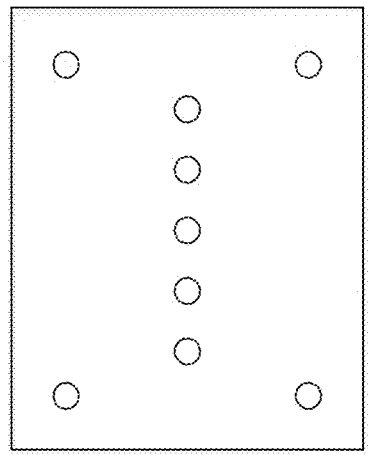
FIG. 1 is a liquid crystal dripping pattern.

As illustrated in FIG. 1, a liquid crystal pattern having a shape of Chinese character "I" (hereinafter as "I-shaped") is provided, such that the target liquid crystal amount is averaged to each position of the liquid crystal pattern. When the liquid crystal is dripped, the liquid crystal in a central region of the liquid crystal pattern and the liquid crystal in a corner region of the liquid crystal pattern are all dripped by using a single liquid crystal dripping nozzle, and the liquid crystal of same amount is dripped at each position.

A LC pattern sample of a certain production line is tested and the test result is provided in Table A. The sample is obtained by using a conventional dripping method and dripping device. It can be seen from the test result that both puncture and light leakage occurs in corners of the LC pattern.

The LC pattern sample is in '272' I-shape, a total amount of liquid crystal is approximately 2.412 mg/Dot, a distance from a corner of the LC pattern to a display port (DP) is approximately 23.072 mm, a distance from the corner of LC the pattern to a Gate Driver on Array (GOA) is approximately 25.478 mm.

TABLE A

| No. | LC Pattern | LC Amount | Distance to DP (mm) | Distance to GOA (mm) | Light Leakage in Corners | Punctured |
|---|---|---|---|---|---|---|
| 1 | '272' I-shaped | 2.412 mg/Dot | 23.072 | 25.478 | 92% | 40% |
| 2 | | | 15.072/ 23.072 | 19.478 | 44% | 50% |
| 3 | | | 13.572/ 16.572 | 14.478/ 16.478 | 30% | 42.50% |
| 4 | | | 15.072 | 16.478 | 1.70% | 100% |
| 5 | | | 15.072 | 14.478 | 0% | 100% |
| 6 | | | 13.572 | 18.478 | 15.60% | 100% |
| 7 | | | 13.572 | 16.478 | 0% | 100% |
| 8 | | | 11.572 | 16.478 | 0% | 100% |
| 9 | | | 11.572 | 14.478 | 0% | 100% |

As illustrated by serial No. 1 in Table A, after a product is cell-assembled, an incidence of light leakage in corners is about 92%, and a punctured rate is about 40%.

As illustrated by serial Nos. 4, 5, 6, 7, 8 and 9 in Table A, while a degree of stretching the pattern in corners is increased, the incidence of the light leakage in corners is decreased, but on the contrary, the punctured rate is increased, even reached 100%.

It is found that the light leakage and the puncture in corners cannot be increased together by simply stretching the LC pattern. Because the puncture is caused by the contact between the liquid crystal and a sealant before ultraviolet (UV) curing process, prolonging a time for the liquid crystal arriving an edge of the sealant may reduce a risk of puncturing the liquid crystal.

An embodiment of the present disclosure provides a liquid crystal dripping nozzle, a liquid crystal dripping device and a method for dripping liquid crystal.

Figure 2:
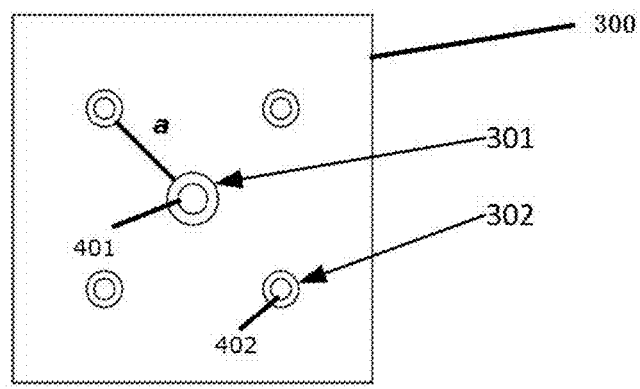
FIG. 2 is a structural schematic diagram of a liquid crystal dripping nozzle according to an embodiment of the present disclosure.

As illustrated in FIG. 2, an embodiment of the present disclosure provides a liquid crystal dripping nozzle, comprising: a carrier 300; a main dripping nozzle 301, disposed in a central region of the carrier 300 and configured for dripping liquid crystal; and a plurality of auxiliary dripping nozzles 302, disposed in a corner region of the carrier 300 and configured for dripping liquid crystal. The plurality of auxiliary dripping nozzles 302 are arranged around the main dripping nozzle 301. For example, the plurality of auxiliary dripping nozzles 302 are uniformly arranged around the main dripping nozzle 301 along a circumference of a circle with the main dripping nozzle 301 as a center.

For example, a circle is drawn by taking the main dripping nozzle 301 as a center and a distance from any one of the auxiliary dripping nozzles 302 to the main dripping nozzle 301 as a radius. As an example, all the auxiliary dripping nozzles 302 are located on the circle at equal interval. As another example, all the auxiliary dripping nozzles 302 are located on a circumference of any geometry including but not limited to triangle, rectangle, ellipse, square, pentagon, preferably at equal interval. For example, four auxiliary dripping nozzles 302 are arranged on four vertexes of a circumscribed rectangle, or arranged on four vertexes of an inscribed rectangle of the circle. As illustrated in FIG. 2, the plurality of auxiliary dripping nozzles 302 are symmetrically arranged on both sides of the main dripping nozzle 301.

In the liquid crystal dripping nozzle described above, an operation of dripping liquid crystal in a central region of a LC pattern may be realized by arranging the main dripping nozzle 301, and an operation of dripping the liquid crystal in a corner region of the LC pattern may be realized by arranging the plurality of auxiliary dripping nozzles 302 uniformly in a circumference of geometry (for example, circle, rectangle, etc.) or arranging the plurality of auxiliary dripping nozzles 302 symmetrically. The central region corresponds to a middle position of the LC pattern, for example, corresponds to a position where the liquid crystal arranged along a column in the middle of the I-shaped LC pattern of FIG. 1. The corner region corresponds to four corner positions of the LC pattern, for example, corresponds to positions where a plurality of small droplets of liquid crystals uniformly arranged along a circumference of the circle in corners of the I-shaped LC pattern of FIG. 1.

For example, as illustrated in FIG. 2, one main dripping nozzle 301 and four auxiliary dripping nozzles 302 are disposed on the carrier 300. It should be noted that, the liquid crystal dripping nozzles may further comprise three, four, five, or more auxiliary dripping nozzles 302, and these auxiliary dripping nozzles 302, for example, may be arranged uniformly in a circumference of geometry or arranged symmetrically.

Figure 3:
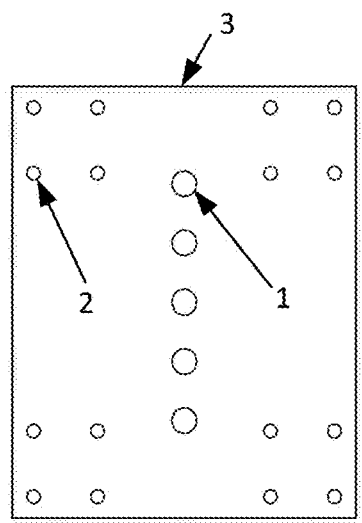
FIG. 3 is a liquid crystal dripping pattern according to an embodiment of the present disclosure.

For example, as illustrated in FIG. 3, the LC pattern comprises a plurality of main dripping positions 1 located in the central region and a plurality of auxiliary dripping positions 2 located in the corner regions. The auxiliary dripping positions 2 located in four corner regions adopts a dripping mode of dividing one to many parts, that is, an amount of the liquid crystal originally dripped into a target point is averagely divided into four equal parts by a disperser, the four parts are arranged uniformly in a circumference of geometry or arranging symmetrically, and a center point of the circle corresponds to a position in the corner region of FIG. 1, that is to say, a total amount of the liquid crystal dripped at every four auxiliary dripping positions in the same corner region of FIG. 3 is equal to a total amount of the liquid crystal dripped at the position of the center point of the same corner region of FIG. 1.

For example, in the embodiment, the main dripping nozzle comprises a first channel 401, each auxiliary dripping nozzle comprises a second channel 402, as illustrated in FIG. 2. In order to ensure that the total amount of the liquid crystal dripped by the auxiliary dripping nozzles 302 is equal to the amount of the liquid crystal dripped by the main dripping nozzle 301, a cross-sectional area of the first channel 401 of the main dripping nozzle 301 is equal to a sum of cross-sectional areas of second channels 402 of all the auxiliary dripping nozzles. In a case that a flow rate of the liquid crystal is constant, the cross-sectional area of the channel may directly affect dripping amount of the liquid crystal, and therefore, the cross-sectional area of the first channel 401 of the main dripping nozzle 301 is equal to the cross-sectional areas of the second channels 402 of the plurality of auxiliary dripping nozzles 302, which may effectively ensure that the total amount of the liquid crystal dripped by the plurality of auxiliary dripping nozzles 302 arranged uniformly is equal to the amount of the liquid crystal dripped by the main dripping nozzle 301. For example, as illustrated in FIG. 2, shapes of the first and second channels 401, 402 are circular, however, the present disclosure is not limited thereto, and the shape of the first or second channel may also be a regular or irregular shape, such as a rectangle, an ellipse, a triangle and the like.

For example, the LC pattern comprises four corner regions, and one or more of the four corner regions comprise positions for arranging the auxiliary dripping nozzles in a circumference of geometry or symmetrically. For example, as illustrated in FIG. 3, each corner regions includes four positions for arranging four auxiliary dripping nozzles 302 in a circumference of geometry or symmetrically.

For example, as illustrated in FIG. 2, a distance a from each auxiliary dripping nozzle 302 to the main dripping nozzle 301 is that: 2 mm≤a≤4 mm. For example, in the embodiment, the distance a is equal to 3 mm (a=3 mm).

The liquid crystal dripping nozzle may realize an operation of dividing one drop to many parts in dripping liquid crystal in a corner region, which may overcome disadvantages caused by an averaged liquid crystal dripping operation of the liquid crystal dripping nozzle in the prior art, and may further increase diffusivity of the liquid crystal at corner positions of a display panel, so that a display region may be completely covered by the liquid crystal, and a probability of light leakage in corners due to insufficient diffusion of the liquid crystal may be reduced greatly; meanwhile, as compared with stretching the corner pattern, in a design of droplet-optimized corner pattern, the droplet-optimized LC pattern has less impact on a sealant 3, so that a risk of puncturing is also reduced greatly.

For example, as illustrated in FIG. 3, an original dripping position in the corner region (i.e., the corner region in FIG. 1) is replaced with a plurality of dripping positions arranged in a circumference of geometry uniformly or arranged symmetrically. For example, the four dripping positions are arranged along a circumference of geometry uniformly, the circle is determined by taking a position of the original dripping position of FIG. 1 as a center and taking 3 mm as a radius, alternatively, the four dripping positions are uniformly arranged along a circumscribed rectangle of a circle having a radius of 2 mm, alternatively, the four dripping positions are located at four vertices of the circumscribed rectangle. The original dripping position is optimally divided into a plurality of dripping position, so that a time for diffusing the liquid crystal to the sealant before box-forming is prolonged, and the puncture is greatly decreased.

After the liquid crystal dripping nozzle of the embodiment is adopted by the sample described above, a comparative result is obtained by testing the sample in same situation, which has an improvement effect of the droplet optimization mode on light leakage and puncture in corners: an incidence of light leakage in corners is approximately 0%, and a puncture rate may be ranged from 30% to 40%.

Figure 4:
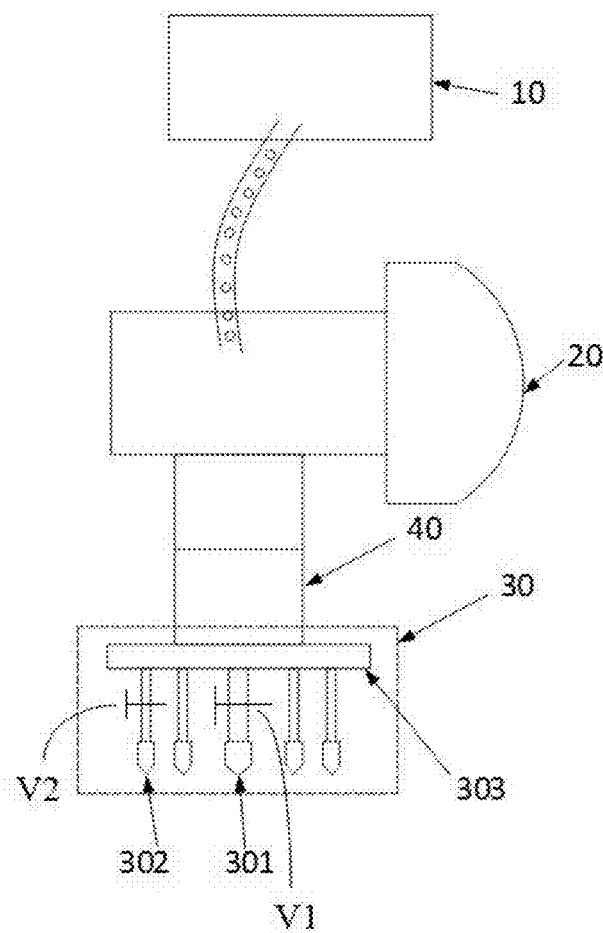
FIG. 4 is a structural schematic diagram of a liquid crystal dripping device according to an embodiment of the present disclosure.

As illustrated in FIG. 4, another embodiment of the present disclosure provides a liquid crystal dripping device, comprising the liquid crystal dripping nozzle described above.

For example, the carrier is a disperser 30. The liquid crystal dripping device further comprises a holder 40 and a disperser 30 arranged on the holder 40. The liquid crystal dripping nozzle (including a main dripping nozzle 301 and a plurality of auxiliary dripping nozzles 302) is arranged on a working surface of the disperser 30. For example, the main dripping nozzle 301 is located in a central region of the working surface 303, and the plurality of auxiliary dripping nozzles 302 are located in a corner region of the working surface 303 and arranged around the main dripping nozzle 301.

For example, the liquid crystal dripping device further comprises a liquid crystal (LC) reservoir 10, and the disperser 30 is communicated with the LC reservoir 10 through a tube.

For example, the liquid crystal dripping nozzle is arranged on a working surface of the disperser 30; the main dripping nozzle 301 is located in a central region of the working surface 303, and a plurality of auxiliary dripping nozzles 302 are located in a corner region of the working surface 303 and arranged around the main dripping nozzle 301.

For example, the disperser 30 comprises a first valve V1 and a second valve V2. The first valve is arranged on the main dripping nozzle 301 and configured for controlling the main dripping nozzle 301, in order to adjust the amount of the liquid dripped by the nozzle 301. The second valve is arranged on each auxiliary dripping nozzle 302 and configured for controlling the auxiliary dripping nozzle 302, in order to adjust the amount of the liquid dripped by the nozzle 302. The main dripping nozzle 301 and the auxiliary dripping nozzle 302 are communicated with the LC reservoir 10 through their respective channels.

It should be noted that the first valve and second valve described above may be valves independent from each other, which are respectively arranged on the first channel of the main dripping nozzle 301 and the second channel of the auxiliary dripping nozzle 302; the first valve and the second valve may be an integral multi-way valve, an inlet port of the multi-way valve is connected with the LC reservoir 10, and a plurality of outlet ports of the multi-way valve is connected with the main dripping nozzle 301 and the auxiliary dripping nozzle 302, respectively.

For example, in the case of performing a linear dripping in a middle part of a substrate, the first valve is opened, and the second valve is closed, so that the main dripping nozzle 301 performs an operation of dripping a single liquid crystal drop; in the case of performing a dispersive dripping in a corner region of the substrate, the second valve is opened, and the first valve is closed, so that the operation of dripping single liquid crystal drop may be converted into a plurality of dispersed liquid crystal drops, which are dripped in a predetermined positions arranged in a circumference of geometry.

For example, as illustrated in FIG. 4, in order to effectively increase operation convenience of the liquid crystal dripping device, the liquid crystal dripping device may further comprise a movable mechanism 20, and a holder 40 is arranged on the movable mechanism 20, to realize easily and conveniently moving the holder 40. For example, the movable mechanism 20 described above may adopt a mechanical arm structure, so that the holder 40 drives the entire disperser 30 to achieve an easy and convenient adjustment operation. By using the mechanical arm, on one hand, an efficiency of dripping the liquid crystal may be increased, and on the other hand, a precision of dripping the liquid crystal may also be improved.

For example, in order to effectively increase adjustability of the disperser 30, a slide rail is further arranged on the working surface of the disperser 30, and at least one of the auxiliary dripping nozzles 302 is configured to move on the slide rail of the working surface 303 of the disperser 30, so that a position of the auxiliary dripping nozzle 302 on the working surface 303 may be changed.

Figure 5:
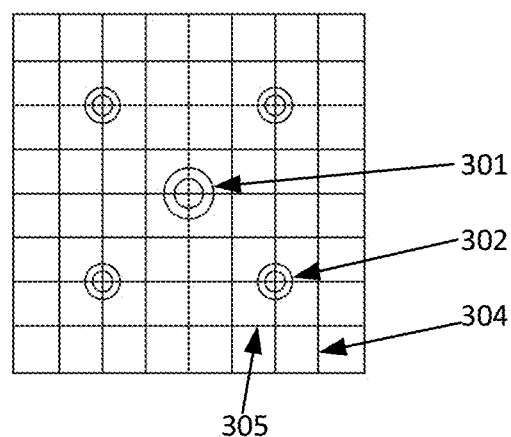
FIG. 5 is a structural schematic diagram of a slide rail according to an embodiment of the present disclosure.

As illustrated in FIG. 5, the slide rail comprises a plurality of transverse rails 305 and a plurality of longitudinal rails 304 arranged on the working surface 303, the transverse rails 305 may be used to realize moving the auxiliary dripping nozzle 302 in an X-axis direction on the working surface 303, and the longitudinal rail 304 may be used to realize moving the auxiliary dripping nozzle 302 in a Y-axis direction on the working surface 303. By arranging the transverse rails 305 and the longitudinal rails 304, a position of the auxiliary dripping nozzle 302 on the working surface 303 may be adjusted quickly and accurately, so as to meet requirements of arranging a linear pattern having different spaces and a droplet-optimized pattern.

For example, the plurality of transverse rails 305 are arranged at equal intervals and the plurality of longitudinal rails 304 are arranged at equal intervals, so that uniformity of dripping the liquid crystal may be increased.

Figure 6:
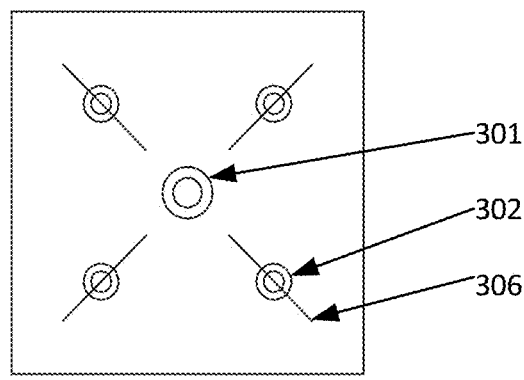
FIG. 6 is a structural schematic diagram of a slide rail according to another embodiment of the present disclosure.

As illustrated in FIG. 6, there is illustrated a structure of another slide rail. The slide rail comprises a plurality of oblique rails 306 extending along a radial direction, one end of the oblique rail 306 is directed to the main dripping nozzle 301, and the other end extends outward; that is, the oblique rails 306 are uniformly (at same intervals) arranged around the main dripping nozzle 301. The rails 306 are oblique with respect to the X-direction by 45°. By arranging the oblique rails 306, a distance between the auxiliary dripping nozzle 302 and the main dripping nozzle 301 may be adjusted conveniently. As illustrated in FIG. 6, an interval between any auxiliary dripping nozzle 302 and the main dripping nozzle 301 is equal.

As illustrated in FIG. 6, the slide rail comprises four oblique rails 306, to satisfy a droplet optimized pattern having one divided to four parts; it should be noted that the slide rails may include five, six or more oblique rails 306, so as to satisfy a droplet optimized pattern having one divided to many parts.

Figure 7:
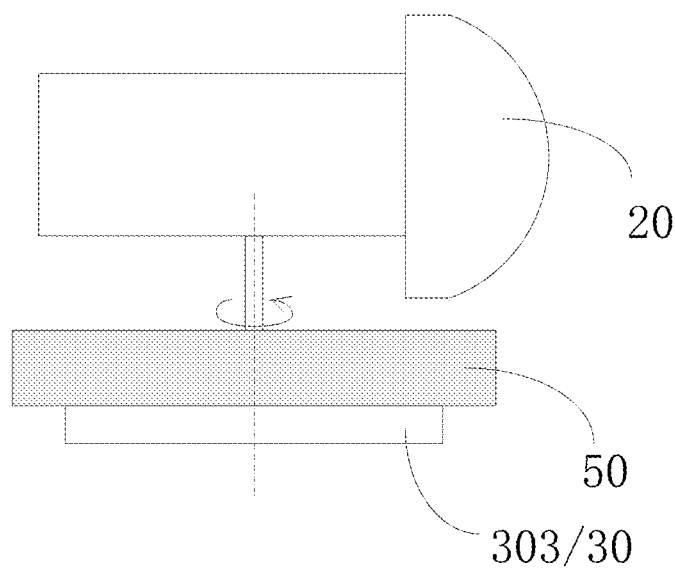
FIG. 7 is a structural schematic diagram of a rotatable mechanism according to an embodiment of the present disclosure.

For example, as illustrated in FIG. 7, in order to further increase the adjustability of the disperser, the liquid crystal dripping device further comprises a rotatable mechanism 50, and the disperser 30 is connected with the movable mechanism 20 through the rotatable mechanism 50. In this case, there is no need to arrange the holder 40, and the disperser 30 is directly arranged on the rotatable mechanism 50 and configured to be rotatable with the rotatable mechanism 50, and the rotatable mechanism 50 is rotatably coupled to the movable mechanism 20.

For example, the rotatable mechanism may be used for realizing an operation of rotating the disperser, further realizing an operation of rotating the working surface by taking the main dripping nozzle as a center axis. When the movable mechanism cannot conveniently adjust a position of the auxiliary dripping nozzle, the rotatable mechanism may be adjusted accordingly, so as to increase the convenience of adjusting the position of the auxiliary dripping nozzle. The rotatable mechanism has an obvious effect when used in a scheme of oblique rails, which may effectively overcome a disadvantage that the auxiliary dripping nozzle may only be adjusted along a predetermined oblique rail.

An embodiment of the present disclosure further provides a liquid crystal dripping method using the liquid crystal dripping nozzle according to any one of the embodiments described above, comprising:

dripping liquid crystal in a central region of a LC pattern through the main dripping nozzle 301;

switching the main dripping nozzle 301 to the plurality of the auxiliary dripping nozzles 302; and dripping the liquid crystal in a corner region of the LC pattern through the plurality of auxiliary dripping nozzles 302, wherein total amount of the liquid crystal dripped by the plurality of auxiliary dripping nozzles is equal to amount of the liquid crystal dripped by the main dripping nozzle.

For example, an operation of dripping liquid crystal in a central region may be first performed, an operation of dripping the liquid crystal in a predetermined position may be performed by the main dripping nozzle 301 under the control of the disperser 30. After the operation of dripping the liquid crystal in the central region is completed, the plurality of auxiliary dripping nozzles 302 are turned on and the main dripping nozzle 301 is turned off. The plurality of auxiliary dripping nozzles 302 are dripped the liquid crystal simultaneously in the same corner region. After an operation of dripping the liquid crystal in four corner regions is completed by the plurality of auxiliary dripping nozzles 302 sequentially, the LC pattern is obtained. The plurality of auxiliary dripping nozzles 302 in the embodiment of the present disclosure can realize a liquid crystal dripping method of dividing one to many parts.

Compared with the prior art, the liquid crystal dripping nozzle and the liquid crystal dripping device, and the method for dripping the liquid crystal in the embodiments of the present disclosure may overcome defects of light leakage and easy puncture in corners in existing dripping device. The conventional liquid crystal dripping nozzle is to average liquid crystal with a same amount per drip, so the diffusivity of the liquid crystal in corners of a display panel is poor, and a display region may not be completely covered by the liquid crystal. The liquid crystal dripping nozzle of the present disclosure may make the display region completely covered with the liquid crystal through the liquid crystal dripping method of dividing one to many parts, thereby reducing the probability of light leakage in corners due to insufficient diffusion of the liquid crystal, and solving a problem of light leakage in corners of the display panel; and meanwhile, an impact on a sealant when dripping the liquid crystal may be also reduced, and thus a risk of puncturing may be effectively reduced.

In the disclosure, the following should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and a size of a layer or area may be enlarged or narrowed, that is, the drawings are not drawn in a real scale.

(3) In case of no conflict, features in one embodiment or in different embodiments can be combined as a new embodiment.

What is described above is related to the illustrative embodiments of the disclosure only and not limitative to the scope of the disclosure; the scopes of the disclosure are defined by the accompanying claims.

The invention claimed is:

1. A liquid crystal dripping nozzle, comprising:
   a carrier;
   a main dripping nozzle, disposed in a central region of the carrier and configured for dripping liquid crystal; and
   a plurality of auxiliary dripping nozzles, disposed in a corner region of the carrier and configured for dripping liquid crystal,
   wherein the plurality of auxiliary dripping nozzles are arranged around the main dripping nozzle, and wherein the main dripping nozzle comprises a first channel each auxiliary dripping nozzle comprises a second channel, a cross-sectional area of the first channel is equal to a sum of cross-sectional areas of second channels of the plurality of auxiliary dripping nozzles.

2. The liquid crystal dripping nozzle according to claim 1, wherein the plurality of auxiliary dripping nozzles are uniformly arranged around the main dripping nozzle along a circumference of a circle with the main dripping nozzle as a center.

3. The liquid crystal dripping nozzle according to claim 1, wherein the plurality of auxiliary dripping nozzles are symmetrically arranged on both sides of the main dripping nozzle.

4. The liquid crystal dripping nozzle according to claim 1, wherein the liquid crystal dripping nozzle comprises one main dripping nozzle and four auxiliary dripping nozzles.

5. The liquid crystal dripping nozzle according to claim 1, wherein a distance between each auxiliary dripping nozzle and the main dripping nozzle is ranged from 2 mm to 4 mm.

6. A liquid crystal dripping device, comprising the liquid crystal dripping nozzle according to claim 1.

7. The liquid crystal dripping device according to claim 6, further comprising a holder, the carrier is a disperser which is arranged on the holder, wherein the liquid crystal dripping nozzle is arranged on a working surface of the disperser.

8. The liquid crystal dripping device according to claim 7, wherein the main dripping nozzle is located in a central region of the working surface, and the plurality of auxiliary dripping nozzles are located in a corner region of the working surface and around the main dripping nozzle.

9. The liquid crystal dripping device according to claim 7, wherein the disperser comprises a first valve and a second valve, wherein the first valve is configured for controlling the main dripping nozzle, and the second valve is configured for controlling the plurality of auxiliary dripping nozzles.

10. The liquid crystal dripping device according to claim 9, wherein the first valve and the second valve are independent valves, or an integral multi-way valve.

11. The liquid crystal dripping device according to claim 7, further comprising a slide rail arranged on the working surface of the disperser, wherein at least one of auxiliary dripping nozzles is configured to be movable on the slide rail.

12. The liquid crystal dripping device according to claim 11, wherein the slide rail comprises a plurality of transverse rails and a plurality of longitudinal rails arranged on the working surface.

13. The liquid crystal dripping device according to claim 11, wherein the slide rail comprises a plurality of oblique rails arranged on the working surface in a radial direction, and one end of each oblique rail is directed to the main dripping nozzle.

14. The liquid crystal dripping device according to claim 7, further comprising a movable mechanism, wherein the holder is arranged on the movable mechanism.

15. The liquid crystal dripping device according to claim 14, further comprising a rotatable mechanism, wherein the disperser is arranged on the rotatable mechanism and configured to be rotatable with the rotatable mechanism, the rotatable mechanism is rotatably coupled to the movable mechanism.

16. A method for dripping a liquid crystal by using the liquid crystal dripping nozzle according to claim 1, comprising:
dripping the liquid crystal in a central region of a liquid crystal pattern through the main dripping nozzle;
switching the main dripping nozzle to the plurality of auxiliary dripping nozzles; and
dripping the liquid crystal in a corner region of the liquid crystal pattern through the plurality of auxiliary dripping nozzles,
wherein a total amount of the liquid crystal dripped by the plurality of auxiliary dripping nozzles is equal to an amount of the liquid crystal dripped by the main dripping nozzle.

* * * * *